United States Patent [19]

Caldine

[11] Patent Number: 5,285,747
[45] Date of Patent: Feb. 15, 1994

[54] ANIMAL DETERRING BIRDFEEDER AND METHOD

[76] Inventor: Harold G. Caldine, 10812 Braddock Rd., Fairfax, Va. 22030

[21] Appl. No.: 659,275

[22] Filed: Feb. 22, 1991

[51] Int. Cl.⁵ ............................................. A01K 39/00
[52] U.S. Cl. .................................. 119/57.9; 119/52.3
[58] Field of Search ................... 119/57.8, 57.9, 29, 119/52.3

[56] References Cited

U.S. PATENT DOCUMENTS 2,856,898  10/1958  Doubleday et al. ............... 119/57.9
5,150,665   9/1992  Boaz ................................. 119/52.3

Primary Examiner—Gene Mancene
Assistant Examiner—Thomas Price
Attorney, Agent, or Firm—Rogers & Killeen

[57] ABSTRACT

A birdfeeder and method for deterring animals includes a pair of bird perches having an electric potential therebetween, the perches being vertically separated and positioned on a container for food so that an animal such as a squirrel attempting to feed from the birdfeeder will likely contact the two electrified perches and receive a mild shock, whereas robin-sized birds or smaller feeding at the bird feeder are too small to simultaneously contact the two perches and do not receive an electric shock.

16 Claims, 1 Drawing Sheet

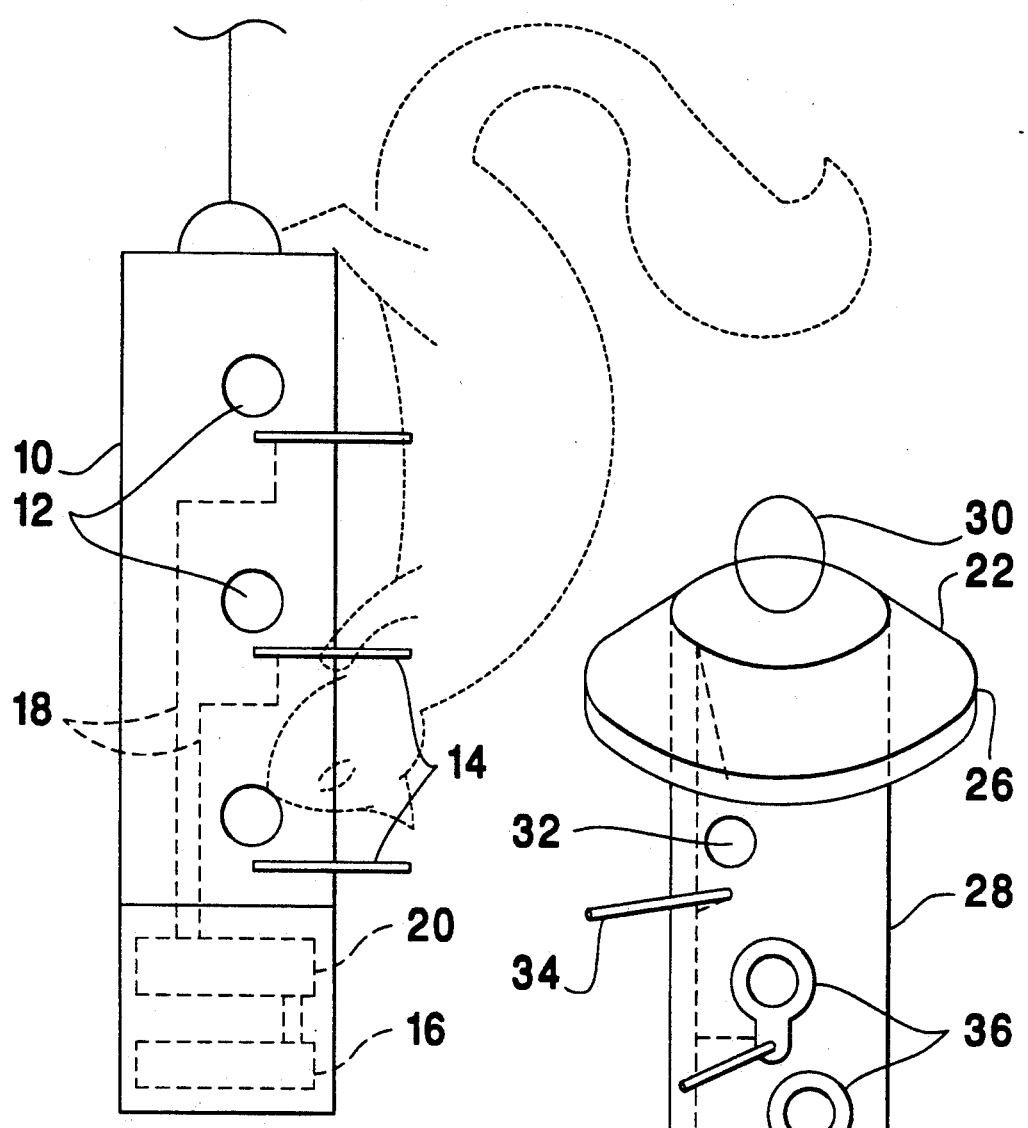

ANIMAL DETERRING BIRDFEEDER AND METHOD

BACKGROUND OF THE INVENTION

The is a birdfeeder and method for deterring feeding at a birdfeeder by wild animals such as squirrels. More particularly, the invention relates to a birdfeeder having perches for birds that provide a mild electric shock to squirrels attempting to feed from the birdfeeder, but not to birds.

Wild animals such as raccoons, opossums, and especially squirrels, can be most troublesome when they appear on birdfeeders. They disrupt the normal eating habits of the birds and consume food intended for the birds. Various types of "squirrel proof" birdfeeders have been introduced with varying degrees of success. Such birdfeeders have typically relied upon mechanical traps or physical barriers to prevent the squirrels from gaining access to the food. Squirrels are almost always able to overcome such traps and physical barriers through their acrobatic ability, ingenuity and/or lack of fear of harm, and the inability of even allegedly "squirrel proof" birdfeeders to consistently deter squirrels from feeding presents a continuing problem.

The present invention uses a mild electric shock to deter animals such as squirrels from feeding at the birdfeeder. It is desirable that the shock not be strong enough to permanently harm animals such as squirrels, but that it be strong enough to deter feeding at the protected birdfeeder.

The use of electricity to train or control animals is well known, but such uses generally do not discriminate between the types of animals affected by the electricity. Traditional physical barriers, even when electrified, are often inappropriate for wily animals such as squirrels. See, for example, the electrified rail fences shown in U.S. Pat. No. 4,118,752 to Iguchi and U.S. Pat. No. 4,706,941 to Sherdan.

Accordingly, it is an object of the present invention to provide a novel animal deterring birdfeeder and method that provides an electric shock to animals attempting to feed from the birdfeeder while not affecting birds feeding therefrom.

It is a further object of the present invention to provide a novel animal deterring birdfeeder and method having electrified bird perches that are vertically separated so that a squirrel attempting to feed from the birdfeeder will likely contact two of the perches and receive an electric shock.

It is yet a further object of the present invention to provide a novel electrified animal deterring birdfeeder and method which is inexpensive to build and operate and which deters animals with a mild and intermittent shock.

These and many other objects and advantages will be readily apparent to one skilled in the art to which the invention pertains from a perusal of the claims and the following detailed description of preferred embodiments when read in conjunction with the appended drawings.

DESCRIPTION OF THE DRAWINGS

FIG. 1 is a schematic representation in elevation of an electrified birdfeeder of the present invention.

FIG. 2 is a pictorial representation of a second embodiment of the birdfeeder of the present invention.

DETAILED DESCRIPTION OF PREFERRED EMBODIMENTS

With reference now to FIG. 1, the present invention may include a generally upright container 10 for holding bird food, the container having suitable conventional means for being held upright, and plural access holes 12, each with an adjacent perch 14 extending outwardly from the container so that birds can sit on the perches 14 to feed on the food in the container 10 through the access holes 12.

The term "bird(s)" as used herein refers to birds of a size for which the birdfeeder is intended, such birds being about the size of a robin or smaller.

The form and size of the container 10 is not significant to the present invention, but should be able to accommodate several vertically spaced perches 14. The form of the container 10 shown in FIG. 1 is but one example of an acceptable container, with many other forms being adaptable by those skilled in the art.

The perches 14 extending outwardly from the container 10 are preferably positioned so that a relatively large animal such as a squirrel with relatively widely spaced limbs attempting to feed from an access hole 12 is likely to simultaneously contact two of the perches 14, while a bird is too small to simultaneous contact two perches. For example, squirrels are known to feed head downward by using their rear limbs to hang from the top of a typical birdfeeder. When a squirrel attempts to feed from the container 10 in this manner, its body is likely to simultaneously contact at least two perches 14 and, as will be discussed, receive an electric shock. Birds, on the other hand, alight on a single perch and do not receive a shock.

Two or more of the perches 14 may be electrifiable. That is, they may be electrically conductive to provide an electric shock to an animal when a circuit connecting the two electrifiable perches is completed by the animal. The electrifiable perches may be made entirely or partially electrically conductive by any conventional technique and are appropriately insulated from each other. For example, the perches may be all metal or include an exposed wire.

The present invention may include a source of electric potential 16 such as a battery and/or may include access to an external source of power. The electric potential may be conveyed to the electrifiable perches through appropriate conventional circuitry so that an electric potential difference is provided between the perches. In the event that an animal such as a squirrel contacts the two perches, the animal's body completes the circuit between the two perches and a mild electric shock is provided to the animal.

The electric potential between the perches can be supplied by a direct or alternating current. For example, a nine volt battery may be used to take advantage of known solid state transistor voltage multiplying techniques. The voltage may be increased with conventional circuitry to between 300 and 1,000 volts, with about 700 volts being preferred. As shown in FIG. 1, the electric potential may be provided to the electrifiable perches through electric wires 18 provided internal to the container 10.

It is desirable that the shock be mild, preferably less than about 1 milliampere and more desirably between 200–400 microamperes. This mild electric shock will not physically harm the animal but will provide a negative learning experience so that the animal is not likely to return to the feeder.

To conserve energy, the electric current provided to the perches may be pulsed at a rate preferably of about five to sixty pulses per minute. Suitable conventional circuitry 20 may be provided to pulse the current.

Alternatively, or in addition, as shown in FIG. 2, a physical barrier such as a roof 22 and/or floor 24 may be provided that includes an electrifiable rim 26 that is connected to the circuitry for the electrifiable perches. In the event an animal such as a squirrel hangs from the top of the container or sits on the floor 24 to feed, the animal would likely contact the rim 26 and an electrifiable perch and receive an electric shock. The rim 26 may be made entirely or partially electrically conductive by any conventional technique and is appropriately insulated from the perches and the remainder of the roof 22 and/or floor 24. For example, the rim may be all metal or include an exposed wire.

The electrifiable perches and rim may be provided in any appropriate combination so that an animal such as a squirrel feeding from the bird feeder will likely receive an electric shock. For example, the perches and/or rim may be provided in pairs with an electric potential difference between the two perches/rim in each pair. Alternatively, all the perches (and rim if provided) can be electrifiable, with alternating perches/rim having an electric potential therebetween. In an embodiment of the present invention without an electrifiable rim and in which two perches are electrifiable, the two electrifiable perches are preferably adjacent and do not include the bottom perch.

With further reference to FIG. 2, a second embodiment of the present invention may include a generally cylindrical or polygomal and transparent container 28 for the bird food that may be formed from a suitable material such as plastic. The container 28 may be held vertically by a hanger 30 or by devices for mounting the container on a pole or wall (not shown). Four access holes 32 and four associated perches 34 may be positioned on the container and vertically separated so that an animal such as a squirrel is likely to touch two electrifiable perches or one such perch and the electrifiable rim (if so provided) when attempting to feed from the container 28. Preferably, the middle two perches are electrifiable.

The access holes (see, for example, those associated with the middle perches in FIG. 2) may have electrifiable guards 36 positioned about their circumference that may be connected to the associated perches so that a squirrel attempting to feed from one of these access holes without touching its associated perch would be likely to at least contact the electrically conductive guard 36.

As shown in FIG. 2, the access holes 32 may be circumferentially offset to invite an animal attempting to feed from the container to support himself on two or more perches 34.

When the electric potential is provided by an external source, an appropriate transformer and/or other circuitry to provide either continuous or pulsed current may be provided. A device 38 for transforming and modifying the power may be located adjacent the container 28 or may be remote therefrom, such as inside the house adjacent to which the feeder is located for viewing by the occupants.

The birdfeeder may also include a signaling device 40 for indicating aurally and/or visually when a squirrel has received the electric shock.

While preferred embodiments have been described, it is understood that the embodiments are illustrative only and that the scope of the invention is to be defined solely by the appended claims when accorded a full range of equivalence, with many variations and modification naturally occurring to those skilled in the art.

I claim:

1. A bird feeder having a squirrel deterrent that provides a mild electric shock to squirrels attempting to feed from the bird feeder but not to birds feeding therefrom, the bird feeder comprising:
    (a) an upright container for birdfood having plural access holes;
    (b) plural electrifiable perches extending outwardly from the container, each being adjacent one of said plural access holes so that a bird may feed on food in the container through one of said access holes while perched on the associated perch,
    adjacent of said electrifiable perches being vertically separated so that a bird cannot simultaneously contact two perches and so that a squirrel attempting to feed from the bird feeder is likely to simultaneously contact an adjacent pair thereof; and
    (c) means for electrifying adjacent of said electrifiable perches,
    whereby a squirrel attempting to support itself on the perches to feed from the bird feeder, or to hang head down from the top of said container, is likely to simultaneously contact an adjacent pair of said electrifiable perches and thereby receive an electric shock so as to deter further feeding activity.

2. The bird feeder as defined in claim 1 wherein said means for electrifying includes means for providing an electric current pulsed at a rate between approximately five and sixty pulses per minute.

3. The bird feeder as defined in claim 2 wherein said means for providing an electric current provides a current less than approximately 1 milliampere.

4. The bird feeder as defined in claim 1 comprising four vertically separated perches, the middle two of which are said electrifiable perches.

5. The bird feeder as defined in claim 1 comprising at least three vertically separated perches, the top two of which are said electrifiable perches.

6. The bird feeder as defined in claim 1 further comprising at least one of a roof and a floor, said one of a roof and a floor having an electrifiable rim electrically connected to said means for electrifying.

7. The bird feeder as defined in claim 1 further comprising an electrifiable guard about the circumference of the ones of said access holes associated with said electrifiable perches, each said guard being electrically connected to the associated one of said perches.

8. The bird feeder as defined in claim 1 further comprising means for providing a signal that an animal has received an electric shock.

9. The bird feeder as defined in claim 1 further comprising:
    at least three said electrifiable perches, and
    at least one of a roof and a floor, said one of a roof and a floor having an electrifiable rim electrically connected to said means for electrifying, each of said electrifiable perches and said one of a roof and a floor having an electric potential different than the ones adjacent thereof.

10. The bird feeder as defined in claim 1 further comprising a source of electric potential internal of said container.

11. The bird feeder as defined in claim 1 further comprising a source of electric potential external of said container.

12. In a bird feeder comprising an upright container for bird food having plural access holes and a bird perch extending outwardly from the container adjacent each of said plural access holes so that birds may feed while perched on a perch, the improvement compromising means to provide an electric shock to squirrels but not to birds by:

spacing adjacent of said perches a distance (a) too great for a bird to simultaneously contact two of said perches and (b) too close for an animal such as a squirrel to avoid simultaneously contacting two of said perches; and including means for providing an electric potential difference to adjacent ones of said perches so as to discourage further feeding activity by a squirrel simultaneously contacting adjacent ones of said perches.

13. A bird feeder having a squirrel deterrent that provides a mild electric shock to squirrels attempting to feed from the bird feeder but not to birds feeding therefrom, the bird feeder comprising:

(a) a generally cylindrical or polygonal transparent upright container for bird food, said container having at least three perches for birds extending outwardly therefrom;

(b) an access hole into the container adjacent each of said perches so that birds may feed from the container while on one of said perches, at least the upper two of said perches being electrifiable, and said perches being vertically separated sufficiently to prevent a bird from simultaneously contacting said two electrifiable perches and being sufficiently close together so that a squirrel or similar animal attempting to feed from one of the lower access holes while hanging from the top of the container is likely to simultaneously contact said two electrifiable perches;

(c) an electrically conductive guard around the circumference of said two upper access holes in electrical contact with the adjacent electrifiable perch; and (d) means for providing an electric potential between said two electrifiable perches so that a squirrel or similar animal attempting to feed from the bird feeder and contacting said two electrifiable perches or the guards associated therewith will receive an electric current of between approximately 0.200 and 1 milliampere therefrom so as to discourage further feeding activity.

14. A method of deterring squirrels or similar animals from feeding at a bird feeder that provides an electric shock to those attempting to feed from the bird feeder but not to birds feeding therefrom, the method comprising the steps of:

(a) providing an upright container for bird food;

(b) providing at least three perches for birds extending from the container, each of said perches being associated with an access hole into the container so that birds may feed from the container while perched on one of the perches, the perches being vertically positioned so that a bird of about the size of a robin cannot simultaneously contact two perches but that a squirrel attempting to feed from a lower one of the access holes in the bird feeder while perched on the top thereof will simultaneously contact an adjacent pair of higher placed perches; and (c) applying an electric potential difference between pairs of higher positioned perches, whereby a squirrel or similar animal attempting to feed from the bird feeder and contacting said pair of perches is likely to receive an electric shock and thereby be discouraged from further feeding activity.

15. The method as defined in claim 14 further comprising the step of attaching a roof to said container, said roof having an electrifiable rim that has an electric potential applied thereto that is different than the electric potential applied to the adjacent one of said pair of perches.

16. The method as defined in claim 14 further comprising the step of providing an electrifiable guard about the circumference of the ones of said access holes associated with said pair of perches, each said guard being electrically connected to the associated one of said pair of perches.

* * * * *